US011019387B2

(12) United States Patent
Streijl

(10) Patent No.: US 11,019,387 B2
(45) Date of Patent: *May 25, 2021

(54) METHOD AND APPARATUS FOR PROVIDING VIDEO CONTENT USING COLLABORATIVE END POINTS

(71) Applicant: AT&T Intellectual Property I, L.P., Atlanta, GA (US)

(72) Inventor: Robert C. Streijl, Brighton, MA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/517,883

(22) Filed: Jul. 22, 2019

(65) Prior Publication Data

US 2019/0342601 A1 Nov. 7, 2019

Related U.S. Application Data

(63) Continuation of application No. 15/237,986, filed on Aug. 16, 2016, now Pat. No. 10,405,023.

(51) Int. Cl.
*H04N 21/41* (2011.01)
*H04N 21/462* (2011.01)
(Continued)

(52) U.S. Cl.
CPC ... *H04N 21/4126* (2013.01); *H04N 21/41407* (2013.01); *H04N 21/44209* (2013.01);
(Continued)

(58) Field of Classification Search
CPC ............ H04N 21/4126; H04N 21/44209
See application file for complete search history.

(56) References Cited

U.S. PATENT DOCUMENTS

| 6,907,501 B2 | 6/2005 | Tariq et al. |
| 7,409,218 B2 | 8/2008 | Bonta et al. |

(Continued)

FOREIGN PATENT DOCUMENTS

| CN | 103000211 A | 3/2013 |
| CN | 104427635 | 3/2015 |
| KR | 20150027771 | 3/2015 |

OTHER PUBLICATIONS

Abiona, O. et al., "Architectural Model for Wireless Peer-to-Peer (WP2P) File Sharing for Ubiquitos Mobile Devices", 2009 IEEE International Conference on Electro/Information Technology. IEEE, 2009, 2009, 35-39.

(Continued)

*Primary Examiner* — Brian T Pendleton
*Assistant Examiner* — Frank Johnson
(74) *Attorney, Agent, or Firm* — Guntin & Gust, PLC; Robert Gingher

(57) ABSTRACT

A method embodying the disclosure includes facilitating communications with mobile user equipment (UE) devices to form a collaborative group that uses a local wireless network. A UE receives video content from a content provider via a first network, presents the video content, and predicts a degradation of presentation quality for a portion of the video content. The UE sends requests to other UEs in the group for subportions of the video content, and receives the subportions via the local wireless network. The requesting UE aggregates the received subportions to obtain an alternate video portion for presentation and thus mitigate the predicted degradation of presentation quality. Other embodiments are disclosed.

20 Claims, 9 Drawing Sheets

(51) Int. Cl.
    *H04N 21/414*    (2011.01)
    *H04W 28/02*     (2009.01)
    *H04W 4/08*      (2009.01)
    *H04N 21/442*    (2011.01)
    *H04N 21/61*     (2011.01)
    *H04N 21/845*    (2011.01)
    *H04N 21/258*    (2011.01)
    *H04N 21/436*    (2011.01)

(52) U.S. Cl.
    CPC ..... *H04N 21/4622* (2013.01); *H04N 21/6131* (2013.01); *H04N 21/8456* (2013.01); *H04W 4/08* (2013.01); *H04W 28/0289* (2013.01); *H04N 21/25841* (2013.01); *H04N 21/43615* (2013.01)

(56) References Cited

U.S. PATENT DOCUMENTS

| | | | |
|---|---|---|---|
| 7,508,840 | B2 | 3/2009 | Delaney et al. |
| 7,657,255 | B2 | 2/2010 | Abel et al. |
| 7,733,808 | B2* | 6/2010 | Hu .............. H04N 21/4788 370/256 |
| 7,873,019 | B2 | 1/2011 | Dawson et al. |
| 7,894,470 | B2 | 2/2011 | Ruckart et al. |
| 7,970,350 | B2 | 6/2011 | Sheynman et al. |
| 8,270,415 | B2 | 9/2012 | Niranjan et al. |
| 8,355,711 | B2 | 1/2013 | Heins et al. |
| 8,428,645 | B2 | 4/2013 | Rao et al. |
| 8,494,502 | B2 | 7/2013 | Abel et al. |
| 8,571,477 | B2 | 10/2013 | Eisenbach et al. |
| 8,640,204 | B2 | 1/2014 | Karaoguz et al. |
| 8,825,092 | B2 | 9/2014 | Sennett et al. |
| 8,874,748 | B2 | 10/2014 | Chen et al. |
| 9,084,003 | B1 | 7/2015 | Sanio et al. |
| 9,084,105 | B2 | 7/2015 | Luna |
| 9,124,523 | B2 | 9/2015 | Mao et al. |
| 9,155,019 | B2 | 10/2015 | Wu et al. |
| 9,198,096 | B2 | 11/2015 | Quigley et al. |
| 9,351,209 | B2 | 5/2016 | Etemad et al. |
| 9,886,415 | B1* | 2/2018 | Cohen ............... G06F 17/30 |
| 10,079,885 | B1* | 9/2018 | Chaboud ........... H04L 67/2847 |
| 2002/0022453 | A1 | 2/2002 | Balog et al. |
| 2004/0139024 | A1 | 7/2004 | So et al. |
| 2006/0025149 | A1* | 2/2006 | Karaoguz ........... H04W 28/24 455/452.2 |
| 2007/0109990 | A1 | 5/2007 | Bennett |
| 2007/0299778 | A1* | 12/2007 | Haveson ......... H04N 21/44227 705/51 |
| 2008/0049626 | A1 | 2/2008 | Bugenhagen et al. |
| 2008/0085682 | A1 | 4/2008 | Rao et al. |
| 2010/0011103 | A1 | 1/2010 | Luzzatti et al. |
| 2010/0036963 | A1 | 2/2010 | Gahm et al. |
| 2011/0055901 | A1 | 3/2011 | Karaoguz et al. |
| 2012/0117183 | A1 | 5/2012 | Wong et al. |
| 2012/0311039 | A1 | 12/2012 | Ogawa |
| 2012/0321008 | A1 | 12/2012 | Krishnaswamy et al. |
| 2012/0331059 | A1 | 12/2012 | Luna et al. |
| 2013/0007201 | A1 | 1/2013 | Jeffrey et al. |
| 2013/0066908 | A1 | 3/2013 | Niranjan et al. |
| 2013/0151626 | A1 | 6/2013 | Hurst et al. |
| 2013/0346494 | A1 | 12/2013 | Nakfour et al. |
| 2014/0073288 | A1 | 3/2014 | Velasco et al. |
| 2015/0063206 | A1* | 3/2015 | Kneckt ............... H04W 16/14 370/328 |
| 2015/0106530 | A1 | 4/2015 | Alanen |
| 2015/0127939 | A1 | 5/2015 | Mazandarany et al. |
| 2015/0230284 | A1 | 8/2015 | Nimbalker et al. |
| 2015/0281317 | A1 | 10/2015 | Du |
| 2015/0281769 | A1 | 10/2015 | Chiu |
| 2015/0319485 | A1 | 11/2015 | Vedula |
| 2016/0029379 | A1 | 1/2016 | Kuchibhotla et al. |
| 2016/0192029 | A1 | 6/2016 | Bergstrom |
| 2017/0188059 | A1 | 6/2017 | Major |
| 2018/0054645 | A1 | 2/2018 | Streijl |

OTHER PUBLICATIONS

Asadi, Arash et al., "A Survey on Device-to-Device Communication in Cellular Networks", IEEE Communications Surveys & Tutorials 16.4 (2014): 1801-1819, 2014, 1-18.

Ball, Rudi, "Content Sharing for Mobile Devices", Imperial College of London Department of Computing, Sep. 2007, 1-107.

Dubois, Daniel J. et al., "Supporting Heterogeneous Networks and Pervasive Storage in Mobile Content-Sharing Middleware", 12th Annual IEEE Consumer Communications and Networking Conference (CCNC). IEEE, 2015, 2015, 1-7.

Janis, Pekka et al., "Device-to-Device Communication Underlaying Cellular Communications Systems", International Journal of Communications, Network and System Sciences 2.3, http://www.SciRP.org/journal/ijcns/, 2009, 169-178.

Korteum, Gerd et al., "When Peer-to-Peer Comes Face-to-Face: Collaborative Peer-to-Peer Computing in Mobile Ad Hoc Networks", First International Conference on Peer-to-Peer Computing, 2001. IEEE, 2001, 2001, 1-15.

Krifa, Amir et al., "BITHOC: A Content Sharing Application for Wireless Ad Hoc Networks", Pervasive Computing and Communications, 2009. PerCom 2009. IEEE International Conference on. IEEE, 2009, 2009, 1-3.

\* cited by examiner

100

300

400

600

METHOD AND APPARATUS FOR PROVIDING VIDEO CONTENT USING COLLABORATIVE END POINTS

CROSS-REFERENCE TO RELATED APPLICATIONS

The present application claims priority to and is a continuation of U.S. patent application Ser. No. 15/237,986, filed Aug. 16, 2016. The contents of the foregoing are hereby incorporated by reference into this application as if set forth herein in full.

FIELD OF THE DISCLOSURE

The subject disclosure relates to video presentations on user equipment (UE), and more particularly to improving a mobile device user's video experience by collaborating with other user devices.

BACKGROUND

Networks with a large number of mobile end-point devices continue to increase in size. A mobile device can travel to areas of varying service quality; congestion can occur on a network with a large number of subscribers. The video quality experienced by a mobile user is thus constantly changing.

BRIEF DESCRIPTION OF THE DRAWINGS

Reference will now be made to the accompanying drawings, which are not necessarily drawn to scale, and wherein.

DETAILED DESCRIPTION

Figure 1:
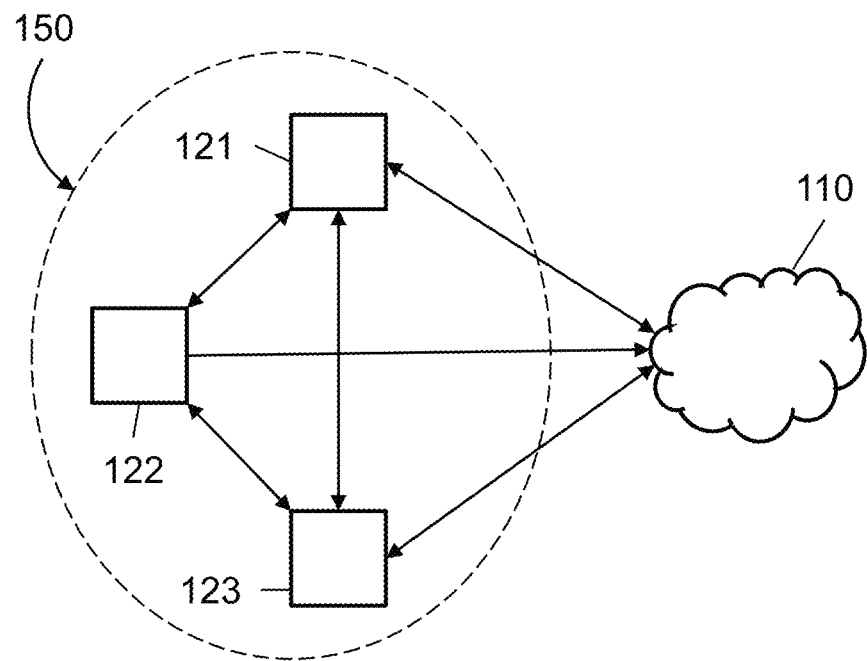
FIG. 1 schematically illustrates user equipment devices (UEs) connecting to each other and to a service provider over a network, in accordance with embodiments of the disclosure.

The subject disclosure describes, among other things, illustrative embodiments for using a collaborative group of UEs to improve a mobile video experience of a user associated with a UE in the group. Other embodiments are described in the subject disclosure.

One or more aspects of the subject disclosure include a method comprising facilitating, by a processing system including a processor, communications with a plurality of user equipment (UE) devices via a local wireless network; the processing system, a first UE device and a second UE device comprise mobile devices coupled to different first, second and third networks respectively. The method also comprises receiving video content from a content provider via the first network, presenting the video content, and predicting a degradation of presentation quality for a portion of the video content resulting in a predicted degradation of presentation quality. The method further comprises transmitting a request to the first UE device for a first subportion of the portion of the video content and to the second UE device for a second subportion of the portion of the video content, and receiving the first subportion and the second subportion of the portion of the video content via the local wireless network from the first and second UE devices respectively, resulting in received subportions; the first UE device obtains the first subportion via the second network and the second UE device obtains the second subportion via the third network. The method also comprises aggregating the received subportions of the portion of the video content to obtain an alternate video portion for presentation, thereby mitigating the predicted degradation of presentation quality.

One or more aspects of the subject disclosure include a device comprising a processing system including a processor and a memory that stores executable instructions that, when executed by the processor, facilitate performance of operations. The operations comprise facilitating communications with a plurality of user equipment (UE) devices via a local wireless network; the processing system, a first UE device and a second UE device comprise mobile devices coupled to different first, second and third networks respectively. The operations also comprise receiving video content from a content provider via the first network, presenting the video content, and predicting a degradation of presentation quality for a portion of the video content resulting in a predicted degradation of presentation quality; the predicting is based at least in part on congestion on the first network exceeding a threshold. The operations further comprise transmitting a request to the first UE device for a first subportion of the portion of the video content and to the second UE device for a second subportion of the portion of the video content, and receiving the first subportion and the second subportion of the portion of the video content via the local wireless network from the first and second UE devices respectively, resulting in received subportions; the first UE device obtains the first subportion via the second network and the second UE device obtains the second subportion via the third network. The operations also comprise aggregating the received subportions of the portion of the video content to obtain an alternate video portion for presentation, thereby mitigating the predicted degradation of presentation quality.

One or more aspects of the subject disclosure include a machine-readable storage medium comprising executable instructions that, when executed by a processing system including a processor, facilitate performance of operations. The operations comprise facilitating communications with a plurality of user equipment (UE) devices via a local wireless network; the processing system, a first UE device and a second UE device comprise mobile devices coupled to different first, second and third networks respectively, and the first, second and third networks are respectively associated with different first, second and third mobile network operators (MNOs). The operations also comprise receiving video content from a content provider via the first network, presenting the video content, and predicting a degradation of presentation quality for a portion of the video content resulting in a predicted degradation of presentation quality. The operations further comprise transmitting a request to the first UE device for a first subportion of the portion of the video content and to the second UE device for a second subportion of the portion of the video content, and receiving the first subportion and the second subportion of the portion of the video content via the local wireless network from the first and second UE devices respectively, resulting in received subportions; the first UE device obtains the first subportion via the second network and the second UE device obtains the second subportion via the third network. The operations also comprise aggregating the received subportions of the portion of the video content to obtain an alternate video portion for presentation, thereby mitigating the predicted degradation of presentation quality.

FIG. 1 schematically illustrates an arrangement 100 of user equipment devices (UEs) connecting to each other and to a service provider over a network, in accordance with an embodiment of the disclosure. In this embodiment, a network service provider (sometimes referred to as a mobile network operator or MNO) on a network 110 communicates with mobile UEs 121, 122, 123, while the UEs communicate with each other on a local wireless network. In other embodiments, some or all of the user equipment devices can communicate via wired connections. Each of the UEs can include a processor and a memory that stores instructions which are executed by the processor.

The UEs can form a collaborative group 150 by virtue of being located within a predefined distance from each other and communicating on the local wireless network. This distance can vary with the type of location (e.g. urban, suburban, etc.), type of equipment (cell phone, smartphone, tablet, etc.), and the communication method used, but generally is less than about 20 m. In an embodiment, each UE identifies other UEs within a predefined distance, and determines whether a UE in the vicinity has a suitable connection for use in a collaboration.

In this embodiment, all network connections are available to all of the UEs, and furthermore each UE has available to it all connections to the other UEs; a given UE in collaborative group 150 thus can share all the resources of the other UEs, including those not presently in use.

The UEs in collaborative group 150 can optimize linking to network 110. In an embodiment, a first UE can determine that a second UE in the group has a higher-quality network connection; content desired at the first UE can be downloaded to the second UE and then transmitted to the first UE via the local wireless network. This embodiment may be implemented using a multi-path transmission control protocol (MP-TCP) to evaluate the different network connections of the UEs in the group.

In a further embodiment, the collaborative group 150 can be formed for a particular purpose and/or a limited period of time, depending on the group's environment and associated privacy concerns. For example, UEs belonging to family members within a residence may form a collaborative group of indefinite duration, while a group of co-workers or acquaintances in an urban area may form a collaborative group only while a specific condition applies (e.g. short-term congestion on the network).

Figure 2:
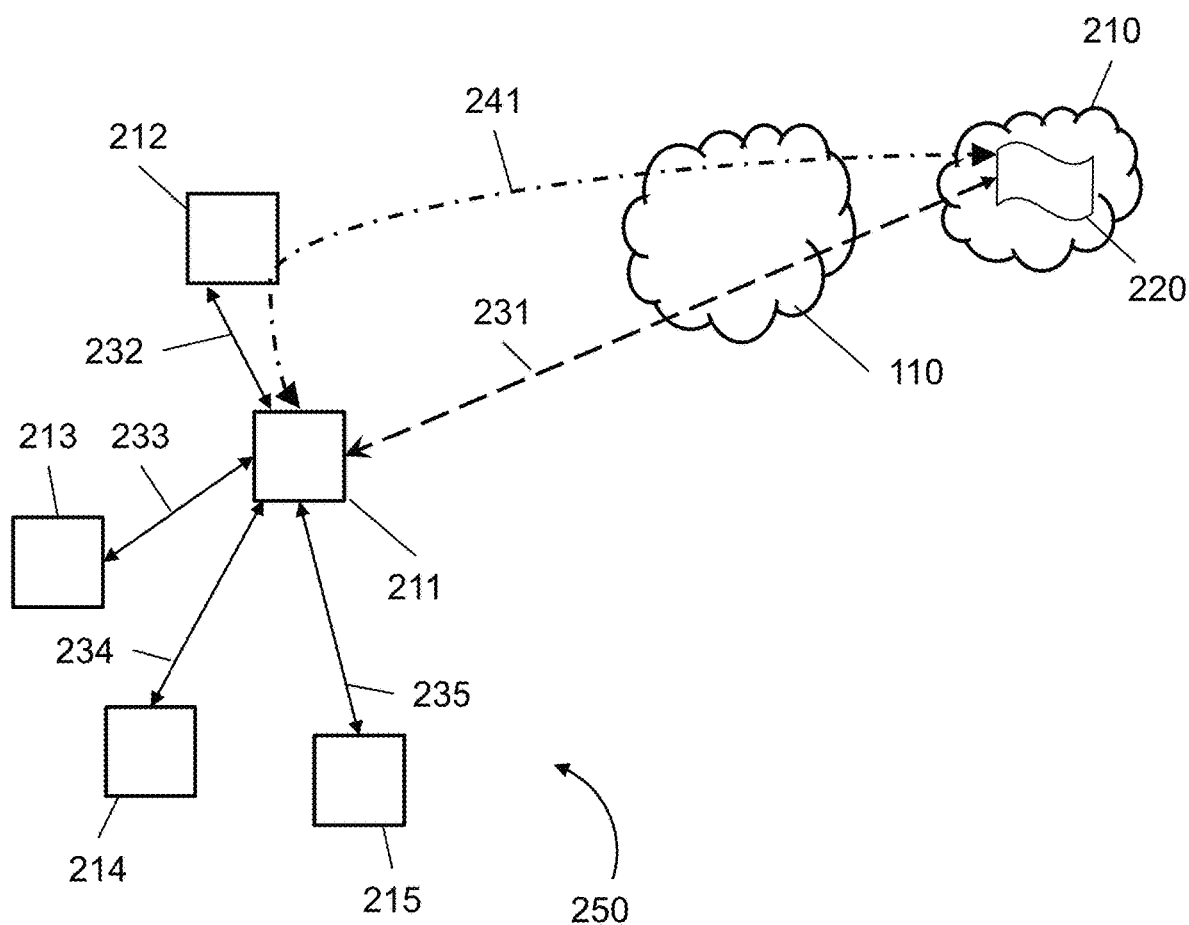
FIG. 2 schematically illustrates collaborating UEs sharing downloaded or user-created content, in accordance with embodiments of the disclosure.

FIG. 2 schematically illustrates an arrangement 200 in which a collaborative group facilitates downloading or uploading of content, in accordance with embodiments of the disclosure. In this embodiment, UEs 211-215 form a collaborative group 250, and communicate with each other via short-range links (e.g. a local wireless network such as Wi-Fi Direct®). Alternatively, some or all of the UEs can communicate via wired connections. As shown in FIG. 2, UE 211 has links 232-235 to the other UEs 212-215. (Although five collaborating UEs 211-215 are shown, it will be appreciated that the collaborative group can include any convenient number of devices.) In this embodiment, each of the UEs includes a cache having content that can be shared with the other UEs. For example, if content 220 is desired at UE 211, UE 211 first requests the content from each of the collaborating UEs. If the content is in the cache of any UE 212-215, UE 211 can obtain the content without sending a request via network 110. If the content is not in any of the shared caches, UE 211 can send a request 231 via network 110 to retrieve content 220 from cloud storage 210.

In another embodiment, content created at UE 211 is stored in the shared cache of UE 211, so that the collaborating UEs can obtain the content without the UE 211 uploading to cloud storage 210 via network 110.

In a further embodiment, if it is desired to upload content created at UE 211, UE 211 can select the best link available in group 250 for uploading to cloud storage 210. For example, UE 211 may select links forming a path 241 that includes link 232 to UE 212 and the link (not shown) from UE 212 to cloud storage 210. In an embodiment, UE 211 evaluates the various paths according to predetermined criteria (e.g. speed, noise, etc.).

Figure 3:
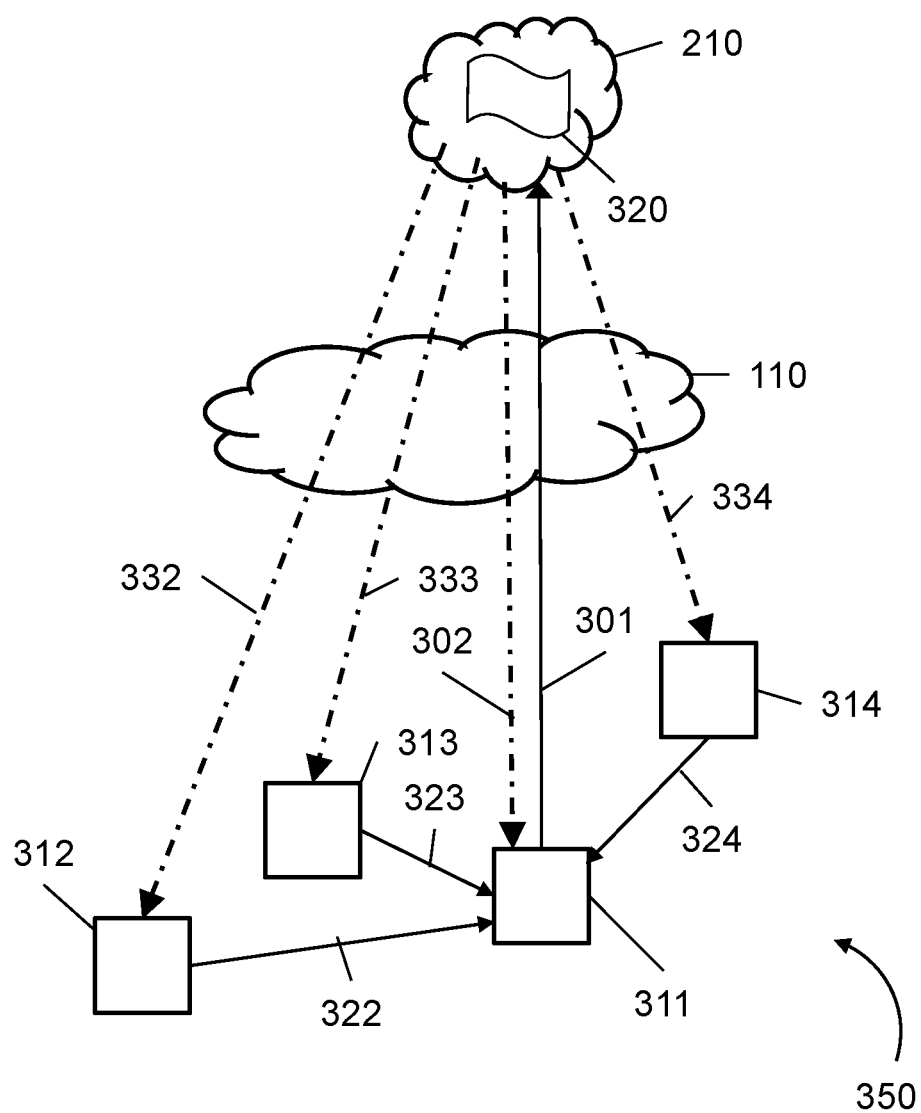
FIG. 3 schematically illustrates collaborating UEs obtaining content via multiple network channels, in accordance with an embodiment of the disclosure.

FIG. 3 schematically illustrates an arrangement 300 in which a collaborative group facilitates downloading or uploading of content, in accordance with further embodiments of the disclosure. In this embodiment, UEs 311-314 form a collaborative group 350, and communicate with each other via short-range links as in FIG. 2.

In an embodiment, if content 320 is desired at UE 311 and is not available in any of the shared caches of UEs 312-314, the UE 311 sends a request 301 via network 110 to retrieve the content from cloud storage 210. The request 301 can include instructions to deliver segments of the content via the other UEs of group 350. The content segments are then delivered to group 350 via multiple channels; channel 302 directly to UE 311, and channels 332-334 to the other UEs 312-314 respectively. The other UEs then send segments of content via short-range links 322-324. In this embodiment, the requesting UE 311 determines which segments are to be obtained by the respective UEs in the collaborative group, and in what order the segments are to be transmitted to the UE 311.

As shown in FIG. 3, content delivery over multiple channels can be invoked by any of the UEs in the collaborative group; in this embodiment, the number of channels corresponds to the number of UEs comprising the group; a requesting UE in a collaborative group with N UEs can thus have a N-fold increase in the number of available channels. UE 311 can thus provide a high-quality video experience even though the network is congested.

In an embodiment, congestion on the network is monitored, and this procedure is automatically initiated when network congestion experienced by the requesting UE exceeds a predetermined threshold, and terminates when network congestion is reduced below that threshold. In other embodiments, this procedure can be invoked when a particular type of content is requested, or at a particular time of day or day of the week when a high level of congestion is expected based on historical network data.

Figure 4:
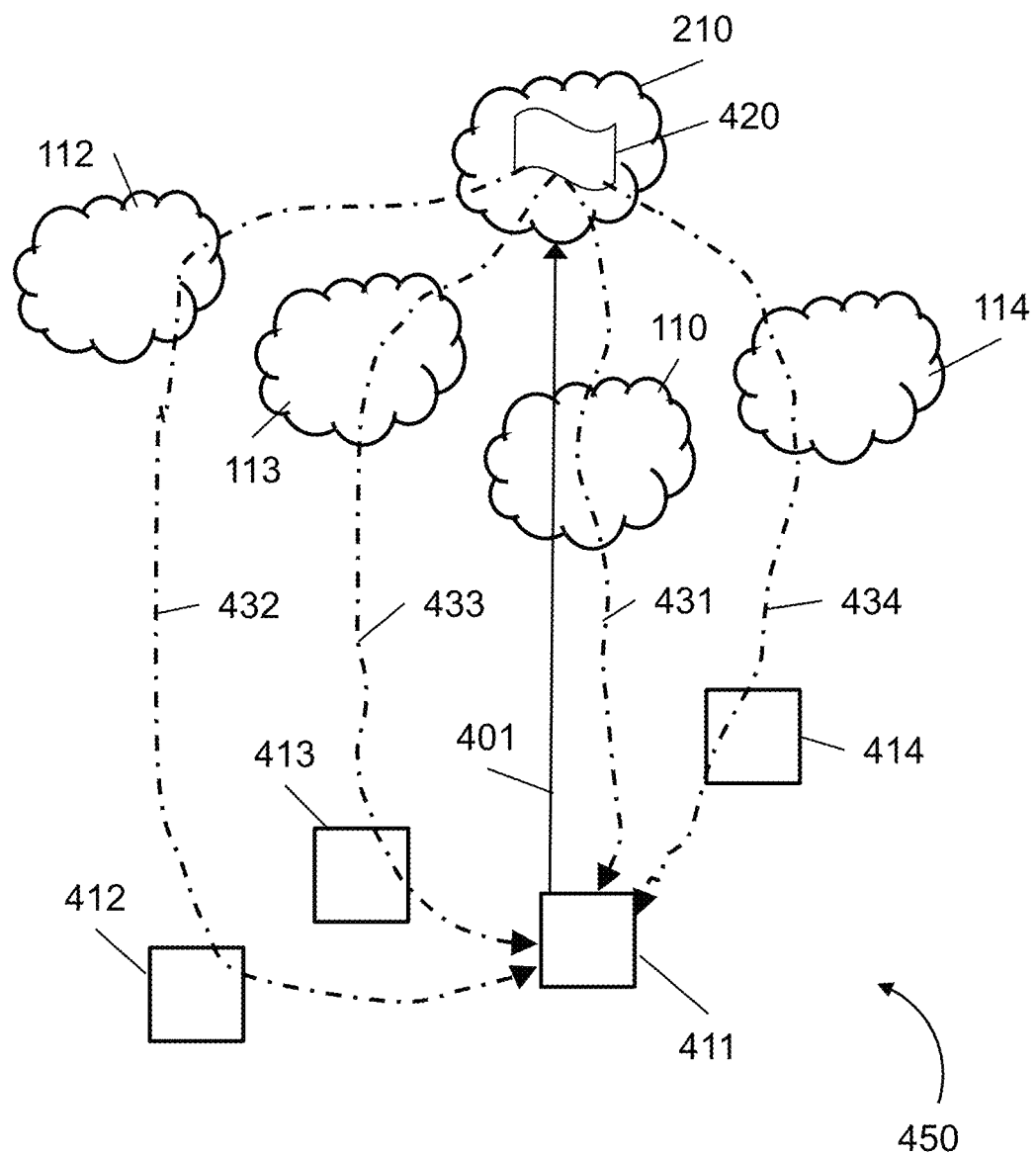
FIG. 4 schematically illustrates UEs served by different network operators collaborating in obtaining content, in accordance with an embodiment of the disclosure.

FIG. 4 schematically illustrates an embodiment 400 in which UEs collaborate in a cross-operator environment. As shown in FIG. 4, UEs 411-414 communicate with different MNOs 110, 112, 113, 114 respectively, while collaborating in group 450; the network connections of the various MNOs are available to each UE in the collaborative group. In this embodiment, UE 411 can send a request 401 to obtain content 420 from cloud storage 210; the request can include instructions to deliver segments of the content using the various MNOs, thereby increasing the number of channels available to UE 411. The segments are then delivered to UE 411 over paths 431-434; each of paths 432-434 for UEs 412-414 includes a path via the MNO associated with that UE, and also includes a short-range link to UE 411 (not shown in FIG. 4).

Figure 5:
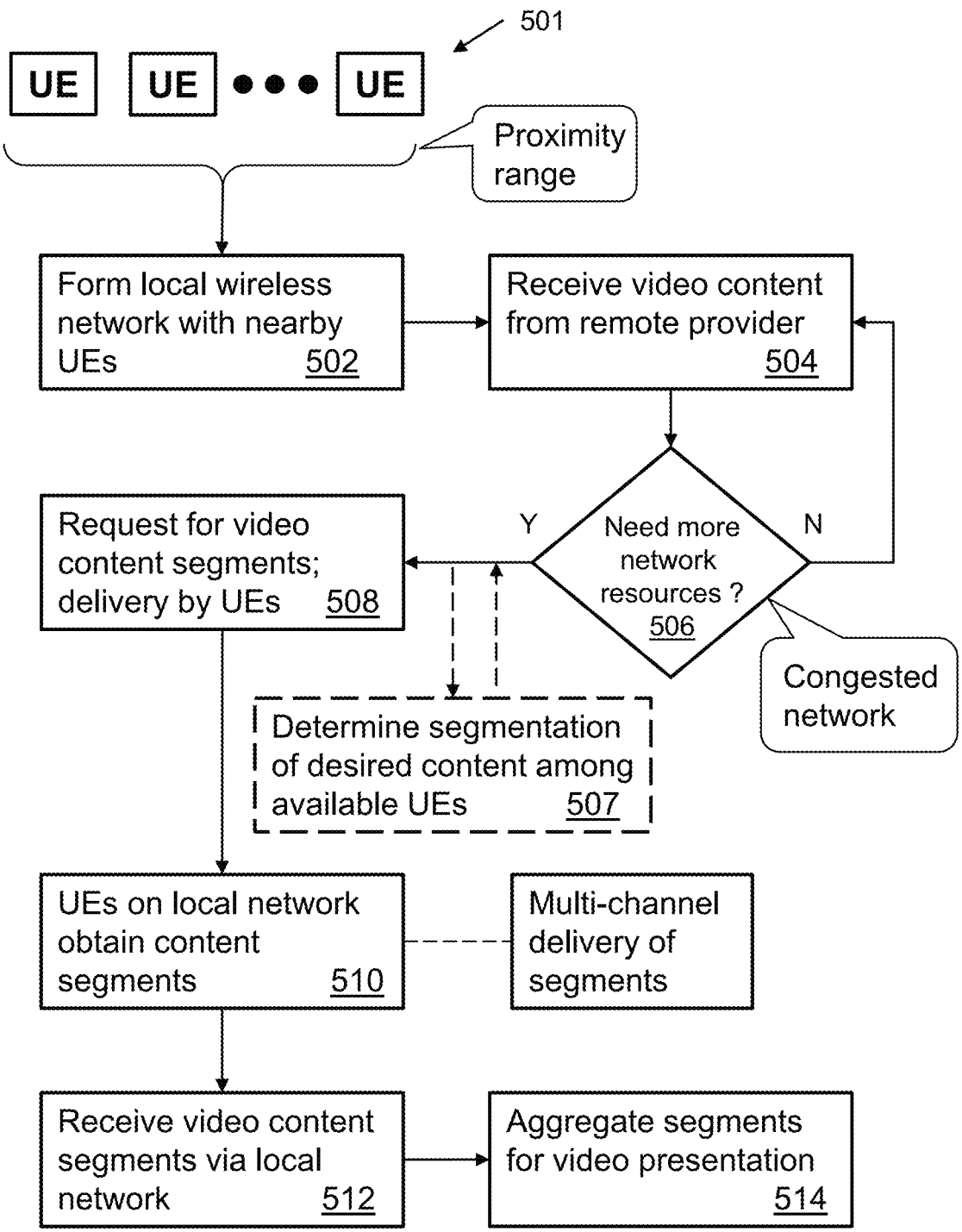
FIG. 5 depicts an illustrative embodiment of a method used in portions of the systems described in FIGS. 1-4.

FIG. 5 is a flowchart depicting an illustrative embodiment of a method 500 used in portions of the systems described in FIGS. 1-4. A group of UEs 501, located within a proximity range, communicate with each other and form a local wireless network (step 502); the proximity range will, in general, depend upon the method of communication used by the UEs and other factors, e.g. a level of privacy concern.

A UE receives video content (step 504) from a content provider remote from the collaborative group. If the UE detects (step 506) a need for more network resources (e.g. detects a degraded quality of the video presentation due to network congestion), the UE sends a request for content (step 508), where the content is segmented and delivered by the respective UEs in the collaborative group. The requesting UE optionally (step 507) determines the segmentation of the content and orchestrates delivery of the segments.

The various UEs in the collaborative group receive the segments of video content (step 510); since each UE has its own communication channel to the content provider, the requesting UE effectively obtains the content via multiple channels, corresponding to an increase in bandwidth available to the requesting UE. In an embodiment, the video content segments are received using an adaptive bit rate (ABR) procedure.

The requesting UE then receives the video content segments from the other UEs via the local network (step 512), and then aggregates the segments (step 514) to provide the video presentation.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
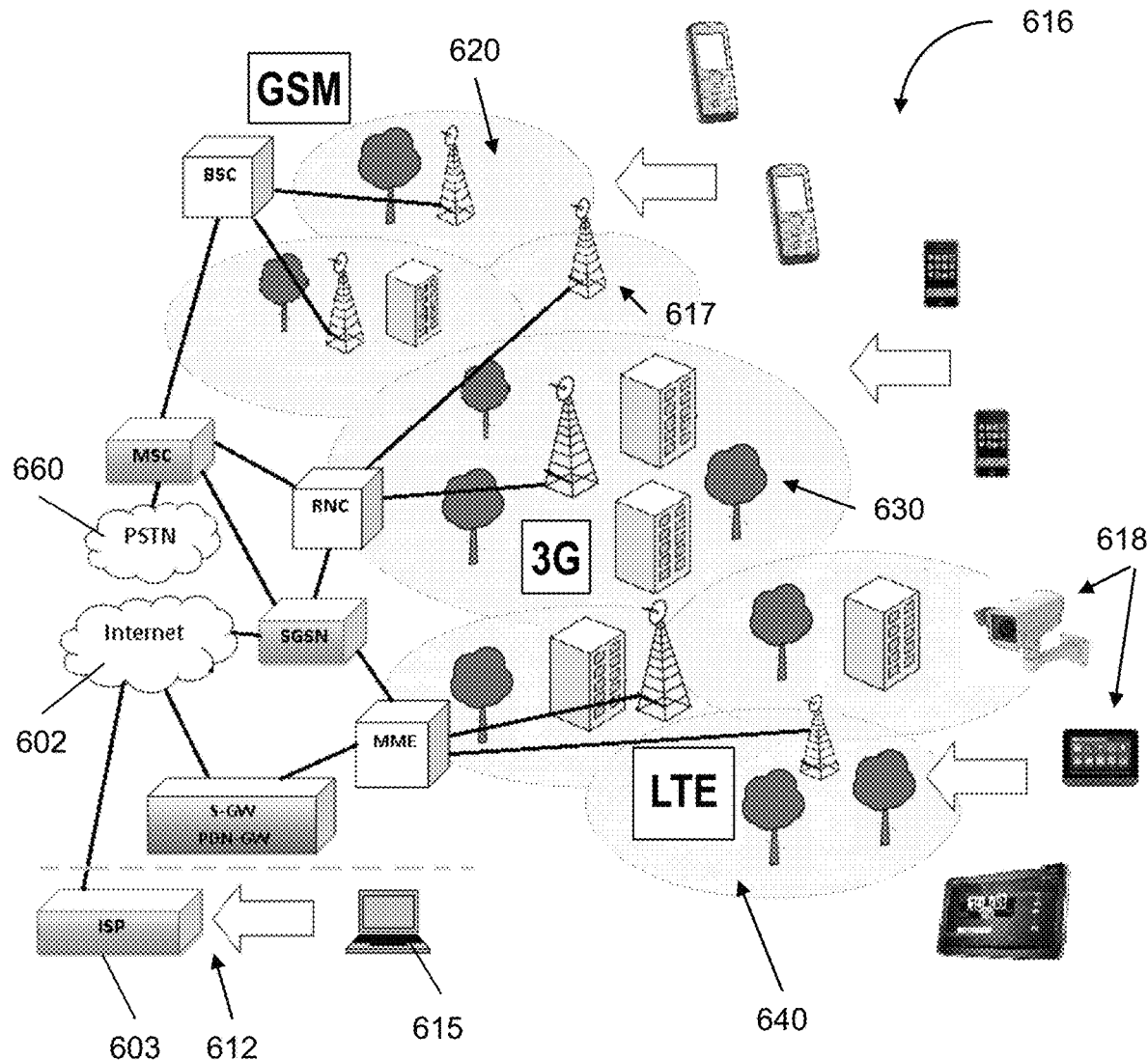
FIGS. 6-7 depict illustrative embodiments of systems that provide communications services to UE devices.

FIG. 6 depicts an illustrative embodiment of an architecture 600 for a network for interacting with mobile communication devices and/or IoT devices. According to an embodiment of the disclosure, one or more mobile devices 616 and IoT devices 618 can connect with one or more of the networks shown in FIG. 6. Mobile devices 616 may represent a variety of technologies (phones, tablets, etc.) and may have an end-to-end connection established with either the Public Switched Telephone Network (PSTN) 660, in the case of voice traffic, or an internet protocol network (Internet) 602, in the case of data traffic. The architecture can include a Global System for Mobile (GSM) network 620, a 3G network 630, and/or a Long Term Evolution (LTE) network 640. In particular, LTE specifications define an all-internet protocol architecture with voice over internet protocol (VoIP).

FIG. 6 also illustrates a device 615 accessing the network through a broadband connection 612 to an Internet Service Provider (ISP) 603. Any of devices 615-616, coupled to a computing device (e.g. a server) of the ISP, can comprise a device comprising a processing system including a processor and a memory that stores executable instructions that, when executed by the processor, facilitate performance of operations; the operations can include facilitating communications with a plurality of user equipment (UE) devices via a local wireless network, where the processing system, a first UE device and a second UE device comprise mobile devices coupled to different first, second and third networks respectively. The operations can also include receiving video content from a content provider via the first network, presenting the video content, and predicting a degradation of presentation quality for a portion of the video content resulting in a predicted degradation of presentation quality, where the predicting is based at least in part on congestion on the first network exceeding a threshold. The operations can further include transmitting a request to the first UE device for a first subportion of the portion of the video content and to the second UE device for a second subportion of the portion of the video content, and receiving the first subportion and the second subportion of the portion of the video content via the local wireless network from the first and second UE devices respectively, resulting in received subportions, where the first UE device obtains the first subportion via the second network and the second UE device obtains the second subportion via the third network. The operations can also include aggregating the received subportions of the portion of the video content to obtain an alternate video portion for presentation, thereby mitigating the predicted degradation of presentation quality.

Figure 7:
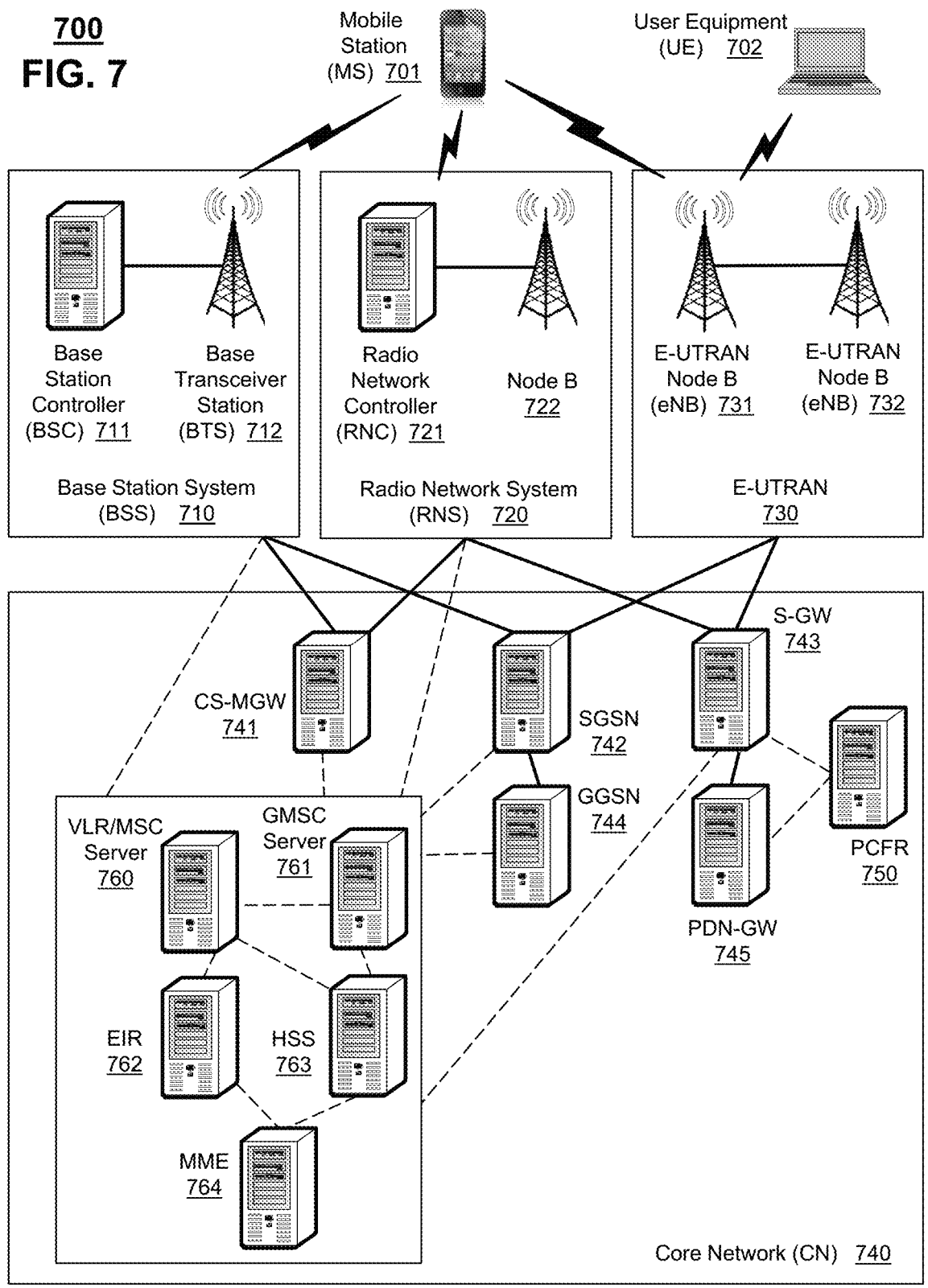

FIG. 7 schematically illustrates a communication system 700 in which one or more embodiments of the subject disclosure may be implemented. Mobile Station 701 may be one of, but not limited to, a cellular telephone, a cellular telephone in combination with another electronic device or any other wireless mobile communication device. According to an embodiment of the disclosure, Mobile Station 701 and/or User Equipment 702 can communicate with one or more of the systems shown in FIG. 7 using carrier aggregation.

Mobile Station 701 may communicate wirelessly with Base Station System (BSS) 710. BSS 710 contains a Base Station Controller (BSC) 711 and a Base Transceiver Station (BTS) 712. BSS 710 may include a single BSC 711/BTS 712 pair (Base Station) or a system of BSC/BTS pairs which are part of a larger network. BSS 710 is responsible for communicating with Mobile Station 701 and may support one or more cells. BSS 710 is responsible for handling cellular traffic and signaling between Mobile Station 701 and Core Network 740. BSS 710 can perform functions that include, but are not limited to, digital conversion of speech channels, allocation of channels to mobile devices, paging, and transmission/reception of cellular signals.

Additionally, Mobile Station 701 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 701 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 701 access to the Core Network (CN).

The evolved UMTS Terrestrial Radio Access Network (E-UTRAN) 730 is a radio access network that provides wireless data communications for Mobile Station 701 and User Equipment 702. E-UTRAN 730 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 730 may include a series of logical network components such as E-UTRAN Node B (eNB) 731 and E-UTRAN Node B (eNB) 732. E-UTRAN 730 may contain one or more eNBs. User Equipment 702 may be any user device capable of connecting to E-UTRAN 730 including, but not limited to, a personal computer, laptop, mobile device, wireless router, or other device capable of wireless connectivity to E-UTRAN 730. The improved performance of the E-UTRAN 730 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 7 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 701 may communicate with any or all of BSS 710, RNS 720, or E-UTRAN 730. In an illustrative system, each of BSS 710, RNS 720, and E-UTRAN 730 may provide Mobile Station 701 with access to Core Network 740. The Core Network 740 may include of a series of devices that route data and communications between end users. Core Network 740 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 741 is part of Core Network 740, and interacts with Visitor Location Register (VLR) and Mobile-Services Switching Center (MSC) Server 760 and Gateway MSC Server 761 in order to facilitate Core Network 740 resource control in the CS domain. Functions of CS-MGW 741 include, but are not limited to, media conversion, bearer control, payload processing and other mobile network processing such as handover or anchoring. CS-MGW 741 may receive connections to Mobile Station 701 through BSS 710, RNS 720 or both.

Serving GPRS Support Node (SGSN) 742 stores subscriber data regarding Mobile Station 701 in order to facilitate network functionality. SGSN 742 may store subscription information such as, but not limited to, the International Mobile Subscriber Identity (IMSI), temporary identities, or Packet Data Protocol (PDP) addresses. SGSN 742 may also store location information such as, but not limited to, the Gateway GPRS Support Node (GGSN) 744 address for each GGSN where an active PDP exists. GGSN 744 may implement a location register function to store subscriber data it receives from SGSN 742 such as subscription or location information.

Serving Gateway (S-GW) 743 is an interface which provides connectivity between E-UTRAN 730 and Core Network 740. Functions of S-GW 743 include, but are not limited to, packet routing, packet forwarding, transport level packet processing, event reporting to Policy and Charging Rules Function (PCRF) 750, and mobility anchoring for inter-network mobility. PCRF 750 uses information gathered from S-GW 743, as well as other sources, to make applicable policy and charging decisions related to data flows, network resources and other network administration functions. Packet Data Network Gateway (PDN-GW) 745 may provide user-to-services connectivity functionality including, but not limited to, network-wide mobility anchoring, bearer session anchoring and control, and IP address allocation for PS domain connections.

Home Subscriber Server (HSS) 763 is a database for user information; HSS 763 can store subscription data regarding Mobile Station 701 or User Equipment 702 for handling calls or data sessions. Networks may contain one HSS 763, or more if additional resources are required. Exemplary data stored by HSS 763 include, but is not limited to, user identification, numbering and addressing information, security information, or location information. HSS 763 may also provide call or session establishment procedures in both the PS and CS domains.

The VLR/MSC Server 760 can provide user location functionality. In an embodiment, when Mobile Station 701 enters a new network location, it begins a registration procedure. A MSC Server for that location transfers the location information to the VLR for the area. A VLR and MSC Server may be located in the same computing environment, as is shown by VLR/MSC Server 760, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 701 registration or procedures for handover of Mobile Station 701 to a different section of the Core Network 740. GMSC Server 761 may serve as a connection to alternate GMSC Servers for other mobile stations in larger networks.

Equipment Identity Register (EIR) 762 is a logical element which may store the International Mobile Equipment Identities (IMEI) for Mobile Station 701. In a typical embodiment, user equipment may be classified as either "white listed" or "black listed" depending on its status in the network. In one embodiment, if Mobile Station 701 is stolen and put to use by an unauthorized user, it may be registered as "black listed" in EIR 762, preventing its use on the network. Mobility Management Entity (MME) 764 is a control node which may track Mobile Station 701 or User Equipment 702 if the devices are idle. Additional functionality may include the ability of MME 764 to contact an idle Mobile Station 701 or User Equipment 702 if retransmission of a previous session is required.

Communication system 700 can be overlaid or operably coupled with system 600. In particular, system 700 can comprise a processing system including a processor that performs a method including facilitating, by the processing system, communications with a plurality of user equipment (UE) devices via a local wireless network; the processing system, a first UE device and a second UE device can include mobile devices coupled to different first, second and third networks respectively. The method can also include receiving video content from a content provider via the first network, presenting the video content, and predicting a degradation of presentation quality for a portion of the video content resulting in a predicted degradation of presentation quality. The method can further include transmitting a request to the first UE device for a first subportion of the portion of the video content and to the second UE device for a second subportion of the portion of the video content, and receiving the first subportion and the second subportion of the portion of the video content via the local wireless network from the first and second UE devices respectively, resulting in received subportions; the first UE device obtains the first subportion via the second network and the second UE device obtains the second subportion via the third network. The method can also include aggregating the received subportions of the portion of the video content to obtain an alternate video portion for presentation, thereby mitigating the predicted degradation of presentation quality.

It is further noted that various terms used in the subject disclosure can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 8:
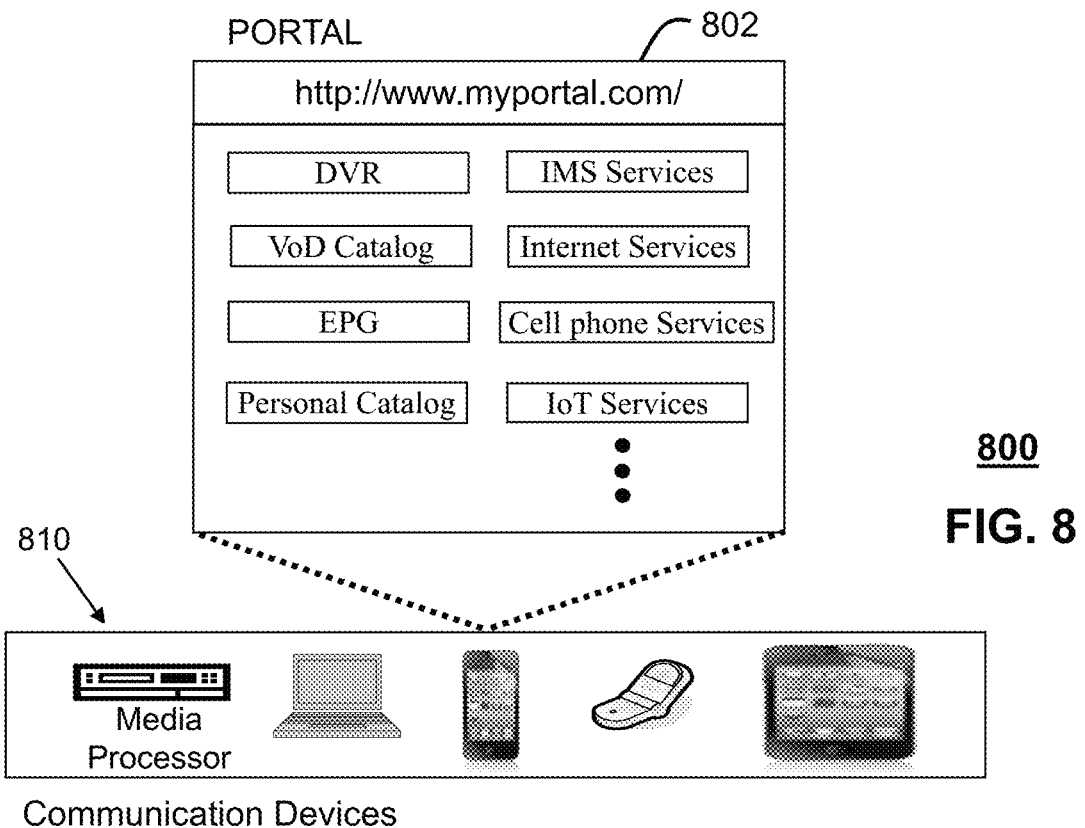
FIG. 8 depicts an illustrative embodiment of a web portal for interacting with the communication systems of FIGS. 6-7.

FIG. 8 depicts an illustrative embodiment of a web portal 802 of a communication system 800. Communication system 800 can be overlaid or operably coupled with the systems of FIGS. 6-7 as another representative embodiment of systems 600-700. The web portal 802 can be used for managing services of communication systems 600-700. A web page of the web portal 802 can be accessed by a Uniform Resource Locator (URL) with an Internet browser using an Internet-capable communication device such as those described in FIGS. 6-8. The web portal 802 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor. The web portal 802 can also be used for provisioning various services on the communication devices 810, for example IMS services, Internet services, cellular phone services, IoT services, and so on. In particular, web portal 802 can be used to access and/or configure IoT devices, and/or perform inventory management of IoT devices.

The web portal 802 can further be utilized to manage and provision software applications and to adapt these applications as may be desired by subscribers and/or service providers of communication systems 600-700. For instance, users of the services provided by servers in systems 600-700 can log into their on-line accounts and provision those servers with information to enable communication with devices described in FIGS. 6-7, and so on. Service providers can log onto an administrator account to provision, monitor and/or maintain the systems 600-700 of FIGS. 6-7.

Figure 9:
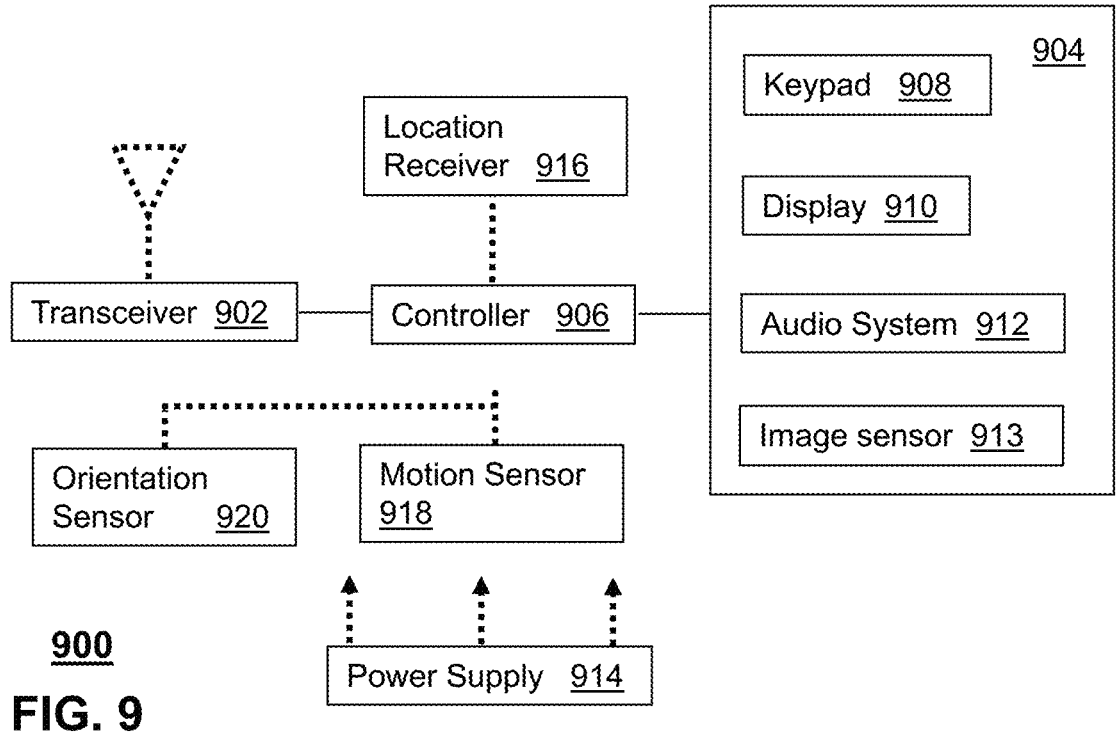
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-4 and can be configured to perform portions of method 500 of FIG. 5.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth. The communication device can include multiple SIM cards for connecting to multiple networks.

The communication device 900 as described herein can operate with more or fewer of the circuit components shown in FIG. 9. These variant embodiments can be used in one or more embodiments of the subject disclosure.

The communication device 900 can be adapted to perform the functions of devices of FIGS. 6 and/or 7. It will be appreciated that the communication device 900 can also represent other devices that can operate in systems of FIGS. 1-4.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
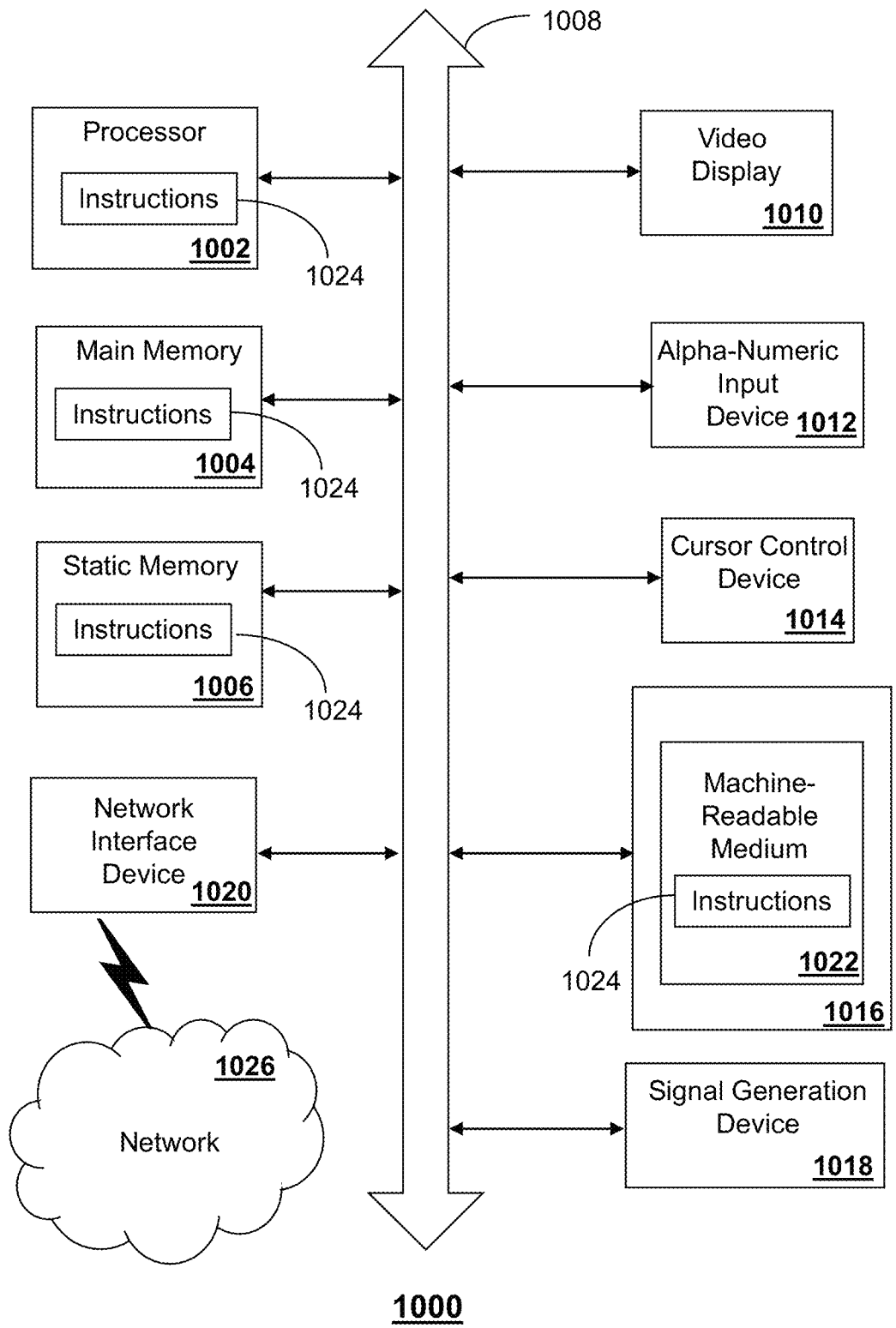
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as a server communicating with the UEs and with the MNO to facilitate formation of the collaborative groups, and other devices of FIGS. 1-4. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
predicting, by a processing system including a processor, a degradation of presentation quality for a portion of video content received from a content provider via a first network, resulting in a predicted degradation of presentation quality;
responsive to the predicted degradation of presentation quality, determining, by the processing system, a segmentation of the portion of the video content, wherein the segmentation assigns a first user equipment (UE) device to provide a first subportion of the portion of the video content and assigns a second UE device to provide a second subportion of the portion of the video content to increase an available bandwidth of content;
transmitting, by the processing system, a request to the first UE device to retrieve the first subportion of the portion of the video content from the content provider and a request to the second UE device to retrieve the second subportion of the portion of the video content from the content provider according to the segmentation that is determined;
receiving, by the processing system, the first subportion and the second subportion of the portion of the video content via a local network from the first and second UE devices respectively, resulting in received subportions, wherein the first UE device obtains the first subportion via a second network and the second UE device obtains the second subportion via a third network, wherein the second network and the third network are distinct from the local network; and
aggregating, by the processing system, the received subportions of the portion of the video content to obtain an alternate video portion for presentation, thereby mitigating the predicted degradation of presentation quality.

2. The method of claim 1, wherein the video content is received using an adaptive bit rate procedure.

3. The method of claim 2, wherein the first and second UE devices communicate according to a multi-path transmission control protocol (MP-TCP).

4. The method of claim 1, wherein the first and second UE devices are included in a collaborative group for a limited period of time.

5. The method of claim 4, wherein each UE device in the collaborative group is associated with a distinct network channel, and wherein a different subportion of the video content is obtained by the collaborative group via each network channel.

6. The method of claim 1, wherein the predicting is based on congestion on the first network exceeding a threshold.

7. The method of claim 1, further comprising:
determining, by the processing system, a correspondence between the first and second subportions and the first and second UE devices respectively; and
determining, by the processing system, a sequence for receiving the first and second subportions.

8. The method of claim 1, wherein the processing system, the first UE device and the second UE device are respectively coupled to equipment of different first, second and third service providers via the first, second and third networks respectively, and wherein the first, second and third service providers respectively comprise different first, second and third mobile network operators (MNOs).

9. The method of claim 1, wherein the predicting is based on historical data for the first network.

10. A device, comprising:
a processing system including a processor; and
a memory that stores executable instructions that, when executed by the processor, facilitate performance of operations comprising:
predicting a degradation of presentation quality for a portion of video content received from a content provider via a first network, resulting in a predicted degradation of presentation quality, wherein the predicting is based at least in part on congestion on the first network exceeding a threshold;
responsive to the predicted degradation of presentation quality, determining a segmentation of the video content, wherein the segmentation assigns a first user equipment (UE) device to provide a first subportion of the portion of the video content and assigns a second UE device to provide a second subportion of the portion of the video content to increase an available bandwidth of content;
transmitting a request to the first UE device to retrieve the first subportion of the portion of the video content from the content provider and a request to the second UE device to retrieve the second subportion of the portion of the video content from the content provider according to the segmentation that is determined;
receiving the first subportion and the second subportion of the portion of the video content via a local network from the first and second UE devices respectively, resulting in received subportions, wherein the first UE device obtains the first subportion via a second network and the second UE device obtains the second subportion via a third network, wherein the second network and the third network are distinct from the local network; and
aggregating the received subportions of the portion of the video content to obtain an alternate video portion for presentation, thereby mitigating the predicted degradation of presentation quality.

11. The device of claim 10, wherein the first and second UE devices communicate according to a multi-path transmission control protocol (MP-TCP).

12. The device of claim 10, wherein the first and second UE devices belong to a collaborative group for a limited period of time.

13. The device of claim 12, wherein UE devices in the collaborative group are located within a predetermined proximity range.

14. The device of claim 12, wherein each of the UE devices in the collaborative group is associated with a distinct network channel, and wherein a different subportion of the video content is obtained by the collaborative group via each network channel.

15. The device of claim 10, wherein the device, the first UE device and the second UE device are respectively coupled to equipment of different first, second and third service providers via the first, second and third networks respectively, and wherein the first, second and third networks are respectively associated with different first, second and third mobile network operators (MNOs).

16. A non-transitory machine-readable storage medium, comprising executable instructions that, when executed by a processing system including a processor, facilitate performance of operations comprising:
predicting a degradation of presentation quality for a portion of video content received from a content provider via a first network, resulting in a predicted degradation of presentation quality;
responsive to the predicted degradation of presentation quality, determining a segmentation of the video content, wherein the segmentation assigns a first user equipment (UE) device to provide a first subportion of the portion of the video content and assigns a second UE device to provide a second subportion of the portion of the video content to increase an available bandwidth of content;
transmitting a request to the first UE device to retrieve the first subportion of the portion of the video content from the content provider and to the second UE device to retrieve the second subportion of the portion of the video content from the content provider according to the segmentation that is determined;
receiving the first subportion and the second subportion of the portion of the video content via a local wireless network from the first and second UE devices respectively, resulting in received subportions, wherein the first UE device obtains the first subportion via a second network and the second UE device obtains the second subportion via a third network, and wherein the second network and the third network are distinct from the local wireless network; and
aggregating the received subportions of the portion of the video content to obtain an alternate video portion for presentation, thereby mitigating the predicted degradation of presentation quality.

17. The non-transitory machine-readable storage medium of claim 16, wherein the first and second UE devices communicate according to a multi-path transmission control protocol (MP-TCP).

18. The non-transitory machine-readable storage medium of claim 16, wherein the first and second UE devices belong to a collaborative group for a limited period of time.

19. The non-transitory machine-readable storage medium of claim 18, wherein each of the UE devices in the collaborative group is associated with a distinct network channel, and wherein a different subportion of the video content is obtained by the collaborative group via each network channel.

20. The non-transitory machine-readable storage medium of claim 16, wherein the predicting is based on congestion on the first network exceeding a threshold.

* * * * *